(12) United States Patent
Nakatani et al.

(10) Patent No.: US 8,050,540 B2
(45) Date of Patent: *Nov. 1, 2011

(54) REPRODUCTION APPARATUS AND COMPUTER REPRODUCTION METHOD

(75) Inventors: Tokuo Nakatani, Katano (JP); Shinichi Saeki, Sakai (JP)

(73) Assignee: Panasonic Corporation, Osaka (JP)

(*) Notice: Subject to any disclaimer, the term of this patent is extended or adjusted under 35 U.S.C. 154(b) by 1797 days.

This patent is subject to a terminal disclaimer.

(21) Appl. No.: 10/964,778

(22) Filed: Oct. 15, 2004

(65) Prior Publication Data

US 2005/0047760 A1 Mar. 3, 2005

Related U.S. Application Data

(62) Division of application No. 09/891,179, filed on Jun. 26, 2001, now Pat. No. 6,839,502.

(30) Foreign Application Priority Data

Jun. 26, 2000 (JP) .................................. 2000-191207
Dec. 22, 2000 (JP) .................................. 2000-391558

(51) Int. Cl.
 *H04N 5/84* (2006.01)

(52) U.S. Cl. ...................................... 386/333; 386/343

(58) Field of Classification Search .................... 386/96, 386/125, 126, 98, 45, 39
See application file for complete search history.

(56) References Cited

U.S. PATENT DOCUMENTS

| 5,596,419 | A | 1/1997 | Yoshimura et al. |
| 6,078,727 | A | 6/2000 | Saeki et al. |
| 6,122,436 | A * | 9/2000 | Okada et al. .................. 386/126 |
| 6,212,330 | B1 * | 4/2001 | Yamamoto et al. ............. 386/95 |
| 6,285,823 | B1 | 9/2001 | Saeki et al. |
| 6,353,702 | B1 | 3/2002 | Ando et al. |
| 6,381,403 | B1 * | 4/2002 | Tanaka et al. .................. 386/106 |
| 6,526,223 | B1 * | 2/2003 | Mori et al. ...................... 386/96 |
| 6,577,811 | B1 | 6/2003 | Kikuchi et al. |
| 6,839,502 | B2 * | 1/2005 | Nakatani et al. ................ 386/82 |
| 6,959,141 | B1 * | 10/2005 | Ichikawa et al. ................ 386/95 |
| 2003/0113096 | A1 | 6/2003 | Taira et al. |
| 2008/0317443 | A1 | 12/2008 | Ando et al. |

FOREIGN PATENT DOCUMENTS

| EP | 860 829 | 8/1998 |
| EP | 0 903 743 | 3/1999 |

(Continued)

OTHER PUBLICATIONS

Supplemental European Search Report issued Jun. 17, 2009 in connection with EP 01 94 1249 corresponding to the present U.S. application.

*Primary Examiner* — Jamie Atala
(74) *Attorney, Agent, or Firm* — Wenderoth, Lind & Ponack, L.L.P.

(57) ABSTRACT

A reproduction route composed of a still image section and a motion image section is recorded on a recordable DVD. A drive device (93) reads picture data from the DVD-RAM. An MPEG decoder (95) decodes and displays the read picture data. By referring to cell information, the judgment is performed as to whether the read picture data belongs to the still image section or the motion image data. If the read picture data belongs to the still image section, the next picture data is read out after a predetermined wait time.

8 Claims, 14 Drawing Sheets

FOREIGN PATENT DOCUMENTS

| | | |
|---|---|---|
| EP | 0 929 072 | 7/1999 |
| EP | 965 991 | 12/1999 |
| EP | 0 971 535 | 1/2000 |
| EP | 1 085 513 | 3/2001 |
| JP | 9-259542 | 10/1997 |
| JP | 10-234002 | 9/1998 |
| JP | 11-96730 | 4/1999 |
| JP | 11-155130 | 6/1999 |
| JP | 11-341443 | 12/1999 |
| JP | 2000-4421 | 1/2000 |
| JP | 2000-69414 | 3/2000 |
| JP | 2000-78519 | 3/2000 |

* cited by examiner

FIG. 9A NORMAL SPEED
FIG. 9B 2X SPEED
FIG. 9C 10X SPEED
FIG. 9D 100X SPEED

REPRODUCTION APPARATUS AND COMPUTER REPRODUCTION METHOD

This application is a divisional of U.S. application Ser. No. 09/891,179 filed Jun. 26, 2001 now U.S. Pat. No. 6,839,502.

BACKGROUND OF THE INVENTION (1) Field of the Invention

The present invention relates to a reproduction apparatus that is capable of reproducing a plurality of sets of picture data recorded on an optical disc with being classified into motion image sections and still image sections. Also, the present invention relates to a computer-readable recording medium that makes a computer execute reproduction processing.

(2) Background Art

Recordable DVDs (Digital Versatile Discs), such as a DVD-RAM (DVD Random Access Memory), DVD-R (Digital Video Disc-Recordable), DVD-R/W (DVD-Read/Write), and DVD+RW (DVD+ReWritable), are used as recording media for wide varieties of devices like video cameras and TV broadcast recorders. In some cases, motion images and still images together constitute one reproduction route. An example of such cases is when a recordable DVD is used as a recording medium for a video camera. Since only a limited number of DVDs can be carried with the video camera, the user wishes to record as many videos as possible onto one DVD. In recent years, some video cameras are capable of recording still images as well as motion images. With this kind of video camera, the user may try to make full use of the total recording time by recording a scene of a moving person as a motion image, and a scene of a motionless landscape as a still image. According to the DVD video recording standard that defines a DVD recording format, the still image and motion image recorded in this way are processed as one reproduction route, as if they are recorded on one video tape. This produces a reproduction route that includes both a motion image section and a still image section on the DVD.

The following describes how a conventional DVD reproduction apparatus reproduces such a reproduction route. A conventional DVD player is roughly composed of a read unit, an MPEG decoder, and a system control unit. The read unit accesses a recordable DVD to read picture data. The MPEG decoder decodes the read picture data. The system control unit receives a user operation and instructs the MPEG decoder to start decoding the picture data.

According to the DVD video recording standard, a still image is generally processed in units of still VOBs (Video OBjects). Each still VOB includes an I-picture (Intra Picture) that is intra-frame coded picture data, and a sequence end code.

The sequence end code indicates the end of the still VOB. Upon decoding the sequence end code, therefore, the MPEG decoder is provided in the DVD player freezes in a state of displaying the lastly decoded picture data. By inserting the sequence end code into each still VOB, the DVD player that is designed to play back motion images can also display still images.

However, the use of the sequence end code for displaying still images has the following disadvantage. Suppose a reproduction route alternately composed of a still image section and a motion image section is recorded onto a recordable DVD. Here, the motion image section is made up of motion VOBs and the still image section is made up of still VOBs. In this case, various special reproduction can be performed in the motion image section, whereas only such limited control that suspends reproduction after displaying each still image can be performed in the still image section. This causes inconsistency in reproducing the motion image section and the still image section.

Special reproduction typically includes rapid reproduction such as "forward scan" and "backward scan", and slow reproduction. When the user wishes to view a motion image section quickly, he or she instructs the DVD player to perform rapid reproduction. On the other hand, when the user wishes to take time viewing the motion image section, he or she instructs the DVD player to perform either normal reproduction or slow reproduction. For a motion image section, the DVD player can comply with the user's intension by accepting designation of such special reproduction. For a still image section, however, the reproduction is always to be suspended once decoding the sequence end code, regardless of the user designation of normal reproduction or special reproduction. This means that reproduction control to comply with the user intention is not at all performed in the still image section.

When the user intends to view the motion image section quickly by special reproduction, he or she designates a reproduction speed, so that the reproduction time of the motion image section is shortened in accordance with the designated speed. For the still image section, however, reproduction is suspended after displaying each still image, regardless of the designated reproduction speed. This may end up irritating the user.

When the still image section includes only a few still images, the user may stand this inconvenience. However, if the still image section includes as many as ten or twenty still images, suspension of the reproduction after displaying each still image will seriously undermine the user's impressions.

SUMMARY OF THE INVENTION

In view of the above disadvantage, the present invention has its principal object the provision of a reproduction apparatus that is capable of displaying sets of picture data included in a still image section in compliance with a user intention made for a motion image section.

The above object can be achieved by a reproduction apparatus for an optical disc on which a plurality of video objects each including at least one set of picture data are recorded, each video object being classified as a motion image section or a still image section, the reproduction apparatus including: a judging unit operable to judge whether special reproduction or normal reproduction is designated for a motion image section by a user; and a reproducing unit operable to reproduce the motion image section and a succeeding still image section, wherein the reproducing unit (a) continues to display each set of picture data included in the succeeding still image section during a first time, when the normal reproduction is designated for the motion image section, and (b) continues to display each set of picture data included in the succeeding still image section during a second time that differs from the first time, when the special reproduction is designated for the motion image section.

According to the above construction, a display time of each set of picture data can be switched in accordance with the user indication of special reproduction. This realizes such reproduction control that shortens the display time of each set of picture data when special reproduction is indicated by the user, compared with the case of normal reproduction. Accordingly, the reproduction control that complies with the user intention can also be realized in the still image section. This realizes consistent reproduction control in both the motion image section and the still image section.

Here, the special reproduction indicates to reproduce each set of picture data included in the motion image section according to a multiple of a normal reproduction speed, a factor of the multiple being designated by the user, and the second time is based on a value obtained by dividing the first time by the designated factor.

According to the above construction, for a reproduction route composed of a motion image section, a still image section, and another motion image section arranged in the stated order, the reproduction time in the still image section can be adjusted according to the user-designated factor of the multiple. Since the reproduction time of the still image section as well as that of the motion image section are uniformly adjusted according to the speed designated by the user, the user can quickly view the contents of the reproduction route that includes both the motion image section and the still image section.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENT

As a preferred embodiment of a reproduction apparatus for a rewritable optical disc relating to the present invention, the following explains a DVD player that performs reproduction processing on a DVD-RAM.

Figure 1:
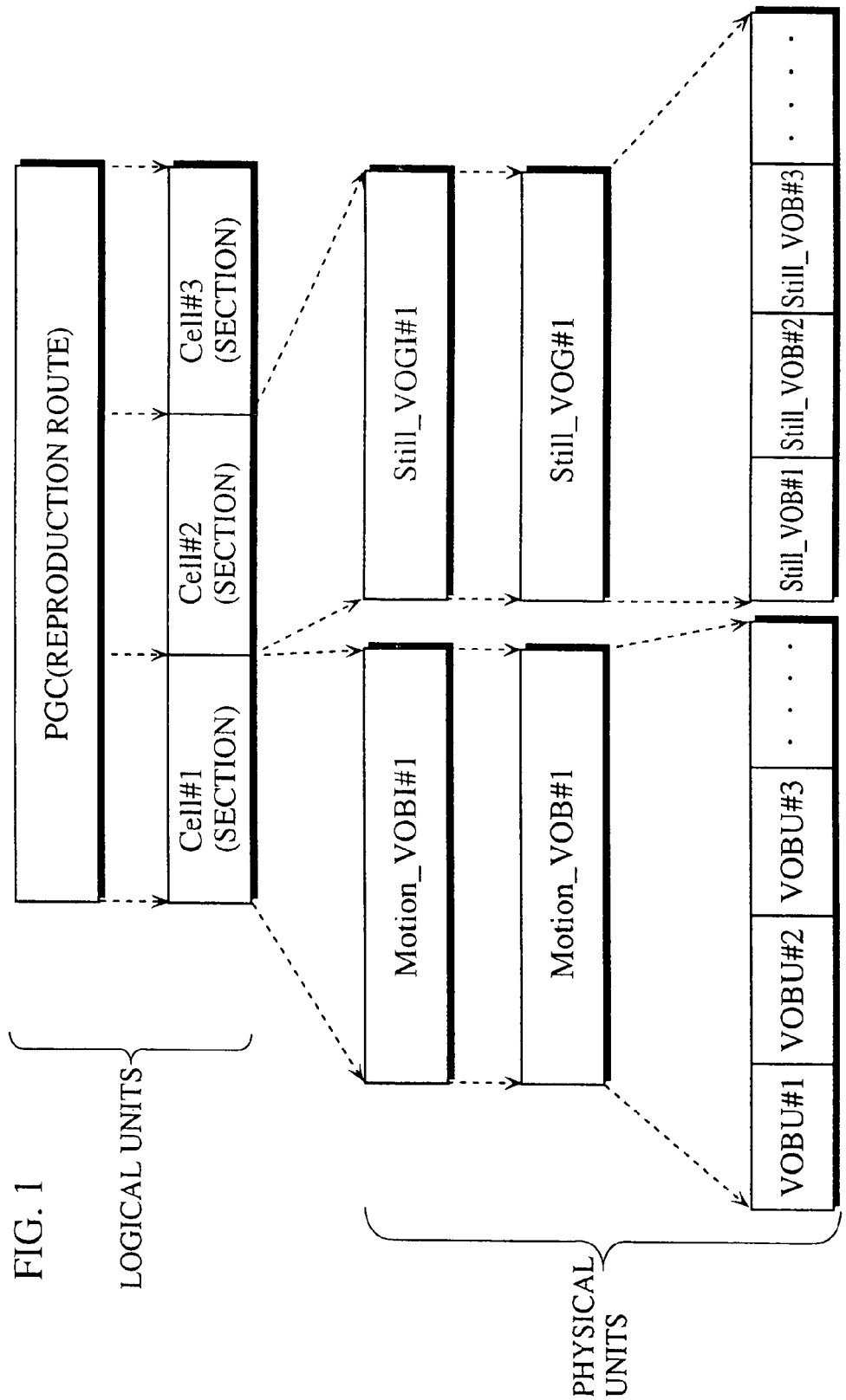
FIG. 1 shows a hierarchy of logical units and physical units in a DVD-RAM.

FIG. 1 shows a hierarchy of logical units and physical units in the DVD-RAM. The top level of the logical units in the hierarchy is a reproduction route called a PGC (program chain). The PGC is made up of at least one PG (program). The PG is divided into units of partial reproduction sections called "cells". There are two types of cells, namely, "motion image cell" and "still image cell". The motion image cell forms a motion image section, whereas the still image cell forms a still image section.

As shown in the figure, a motion VOB (Video OBject) "Motion_VOB" and a still VOG (Video Object Group) "Still_VOG" are physical units in the DVD-RAM. The motion VOB is made up of a plurality of VOBUs (Video Object Units), "VOBU#1", "VOBU#2", "VOBU#3"..., and the still VOG is made up of at least one still VOB, "Still_VOB#1", "Still_VOB#2", "Still_VOB#3", .... The motion VOB and the still VOG are respectively accompanied by special information "Motion_VOBI" and special information "Still_VOGI", and are accessed via the special information.

Figure 2:
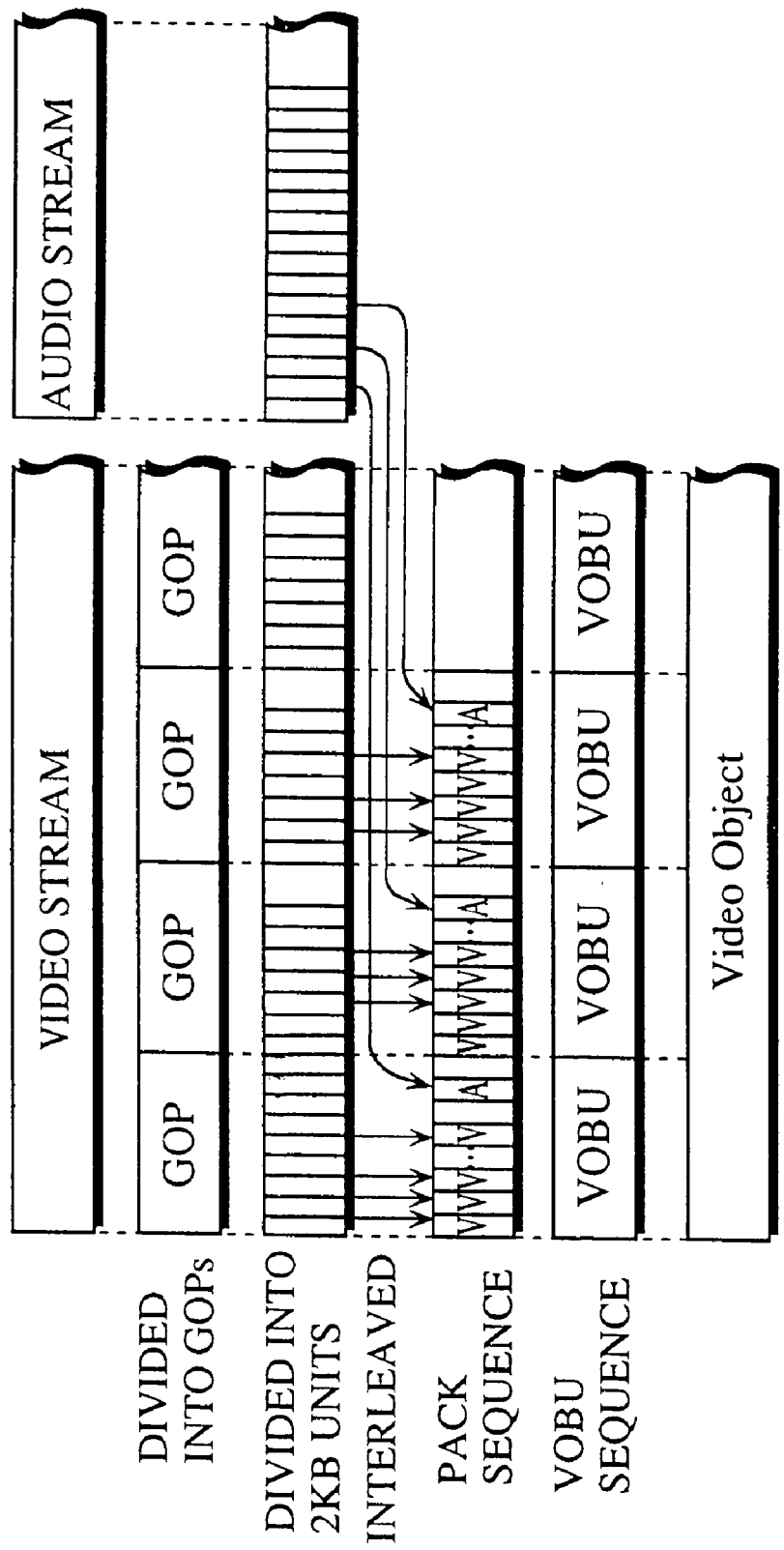
FIG. 2 shows a detailed hierarchical structure of a motion VOB.

Referring now to FIG. 2, an explanation will be given on an internal structure of the motion VOB. FIG. 2 shows the detailed hierarchical structure of the motion VOB. The motion VOB is a program stream under ISO (International Organization for Standardization)/IEC (International Electrotechnical Commission) 13818-1, which is obtained by multiplexing a video stream and an audio stream, although it does not have a program_end_code at the end. The logical format located on the lowest level in the hierarchy is shown in more detail in the higher levels.

The video stream that is located on the highest level in the figure is shown divided into a plurality of GOPs (Group Of Pictures) on the second level. The picture data in GOP units is divided into a number of 2 KB units. On the other hand, the audio stream shown on the right of the highest level is divided into a number of approximately 2 KB units on the third level. The picture data for a GOP unit that is divided into 2 KB units is interleaved with the audio stream that is similarly divided into approximately 2 KB units. This produces the pack sequence shown on the fourth level. This pack sequence forms a plurality of VOBUs that are shown on the fifth level, with the VOB shown on the sixth level being composed of a plurality of these VOBUs arranged in a time series. In the figure, the guidelines drawn using broken lines show the relations between the data in the data structures on adjacent levels. By referring to the guidelines in the figure, it can be seen that the VOBUs on the fifth level correspond to the pack sequence on the fourth level and the picture data in GOP units shown on the second level.

As can be seen by tracing the guidelines, each VOBU is a unit that includes at least one GOP composed of picture data with a reproduction time of around 0.4 to 1.0 second and audio data that has been interleaved with this picture data. At the same time, each VOBU is composed of an arrangement of video packs and audio packs under the MPEG (Moving Picture Expert Group) standards.

Figure 3:
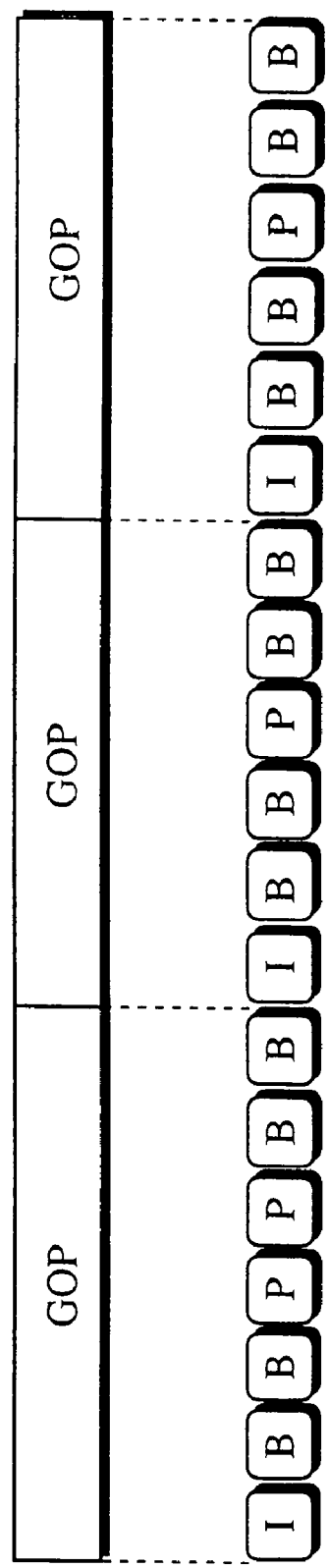
FIG. 3 shows an internal structure of GOPs.

Next, an explanation will be given on an internal structure of a GOP. FIG. 3 shows the internal structure of GOPs. As shown in the figure, each GOP is composed of an arrangement of a plurality of sets of picture data that each are to be displayed as one frame by a display apparatus. Each GOP is a video stream part that corresponds to reproduction time of around 0.4 to 1.0 second. There are three types of picture data, namely, a Bidirectionally Predictive Picture (B-picture), a Predictive Picture (P-picture), and an Intra Picture (I-picture). A B-picture is compressed using the temporal correlation with images to be reproduced both before and after the present image. A P-picture is compressed using the temporal correlation with an image to be reproduced before the present image. An I-picture is compressed using the special frequency characteristics within one frame of the present image.

Next, an explanation will be given on a still VOG.

The still VOG "Still_VOG" is composed of a maximum of 64 "Still_VOBs". Each "Still_VOB" is a set of picture data that corresponds to one still image. There are four types of Still_VOB that respectively correspond to the following four types of still images. The first type is a still image without an audio. The second type is a still image with an original audio. The third type is a still image with an after-recording audio. The original audio here indicates an audio recorded at the time the still image is recorded. The after-recording audio indicates an audio recorded with after-recording, meaning that the audio is recorded after the still image is recorded. The fourth type is a still image with both an original audio and an after-recording audio, meaning that the still image has the original audio and the other audio respectively recorded at the time/after the still image is recorded.

Figure 4:
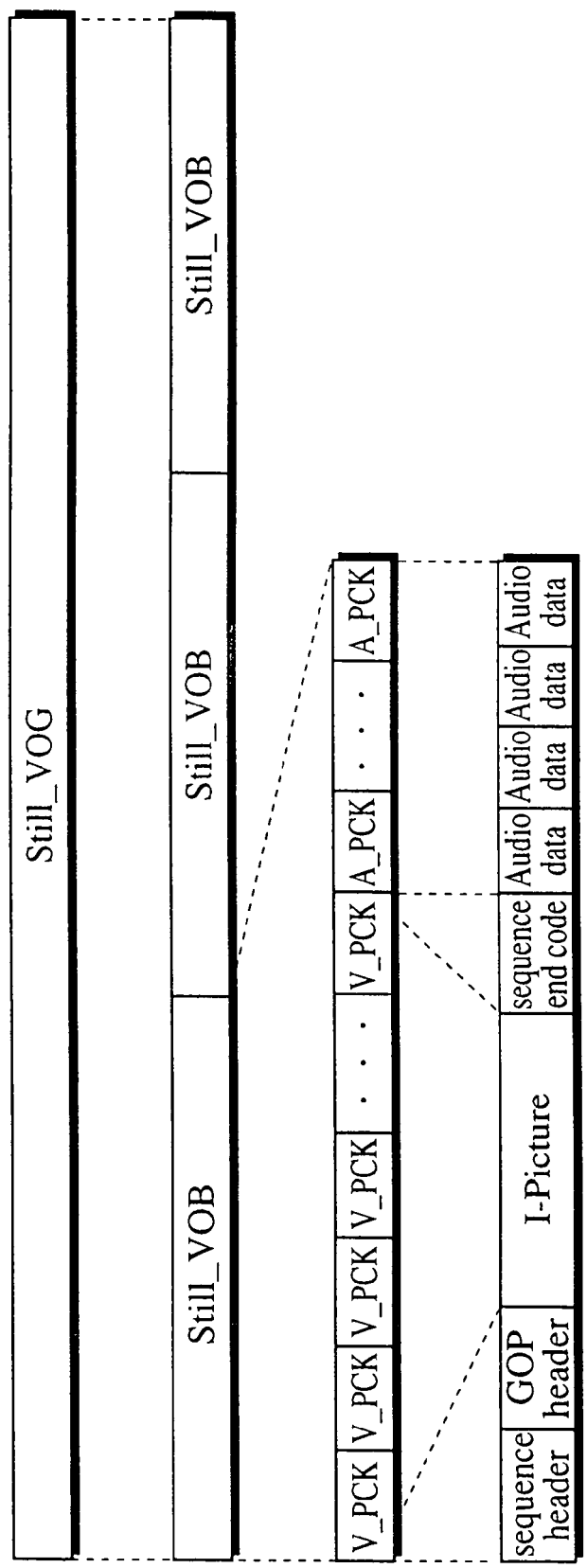
FIG. 4 shows a structure of a "Still_VOB" with original audio data.

FIG. 4 shows the structure of a "Still_VOB" with original audio data. As shown at the bottom level in the figure, the "Still_VOB" includes a sequence header, a GOP header, an I-picture that is intra-frame coded picture data, a sequence end code, and a plurality of sets of audio data to be reproduced simultaneously with the I-pictrue. The I-picture and the sets of audio data are divided into pack sizes as is the case with a motion VOB. Each part obtained by dividing the I-picture and each part obtained by dividing the sets of audio data are respectively stored into a pack "V_PCK" and a pack "A_PCK". A "Still_VOB" is treated as a group of these packs. Note that a "Still_VOB" of a still image with an after-recording audio or without an audio does not include any audio data.

Figure 5:
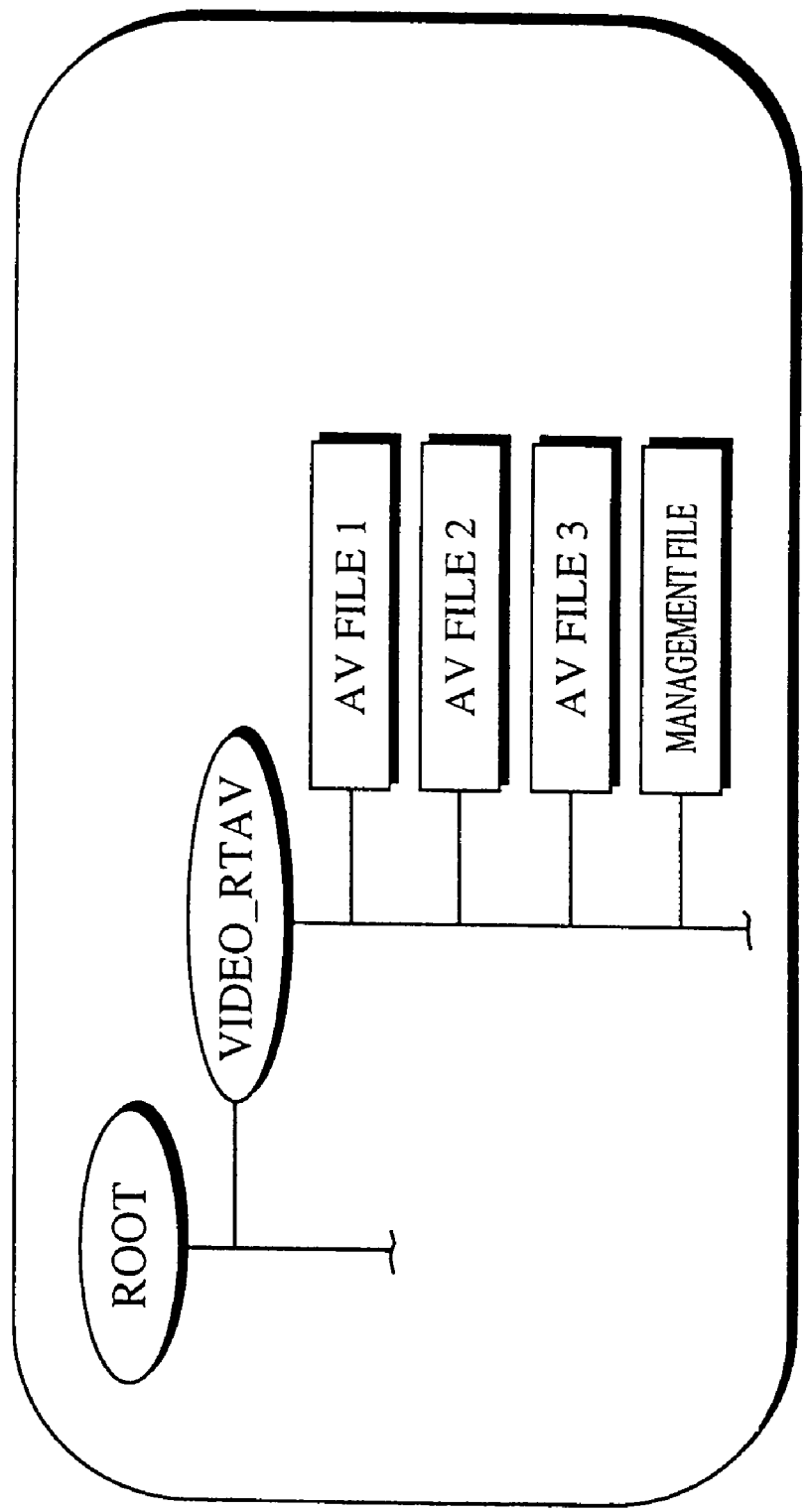
FIG. 5 shows a file structure of the DVD-RAM.

The following is an explanation of a file structure and a data structure that realize the physical units and logical units described above. FIG. 5 shows a file structure of the DVD-RAM. As shown in the figure, the root directory in the DVD-RAM includes a directory called "VIDEO_RTAV (Real Time Recording Audio Video)". The "VIDEO_RTAV" directory includes files called an AV file 1, an AV file 2, an AV file 3, and a management file.

The AV file 1 includes at least one VOB, the AV file 2 includes at least one still VOG, and the AV file 3 includes audio data for after-recording. The management file includes various sets of management information required for processing a motion VOB and a still VOG respectively included in the AV file 1 and the AV file 2, in the logical units described in FIG. 1.

Figure 6:
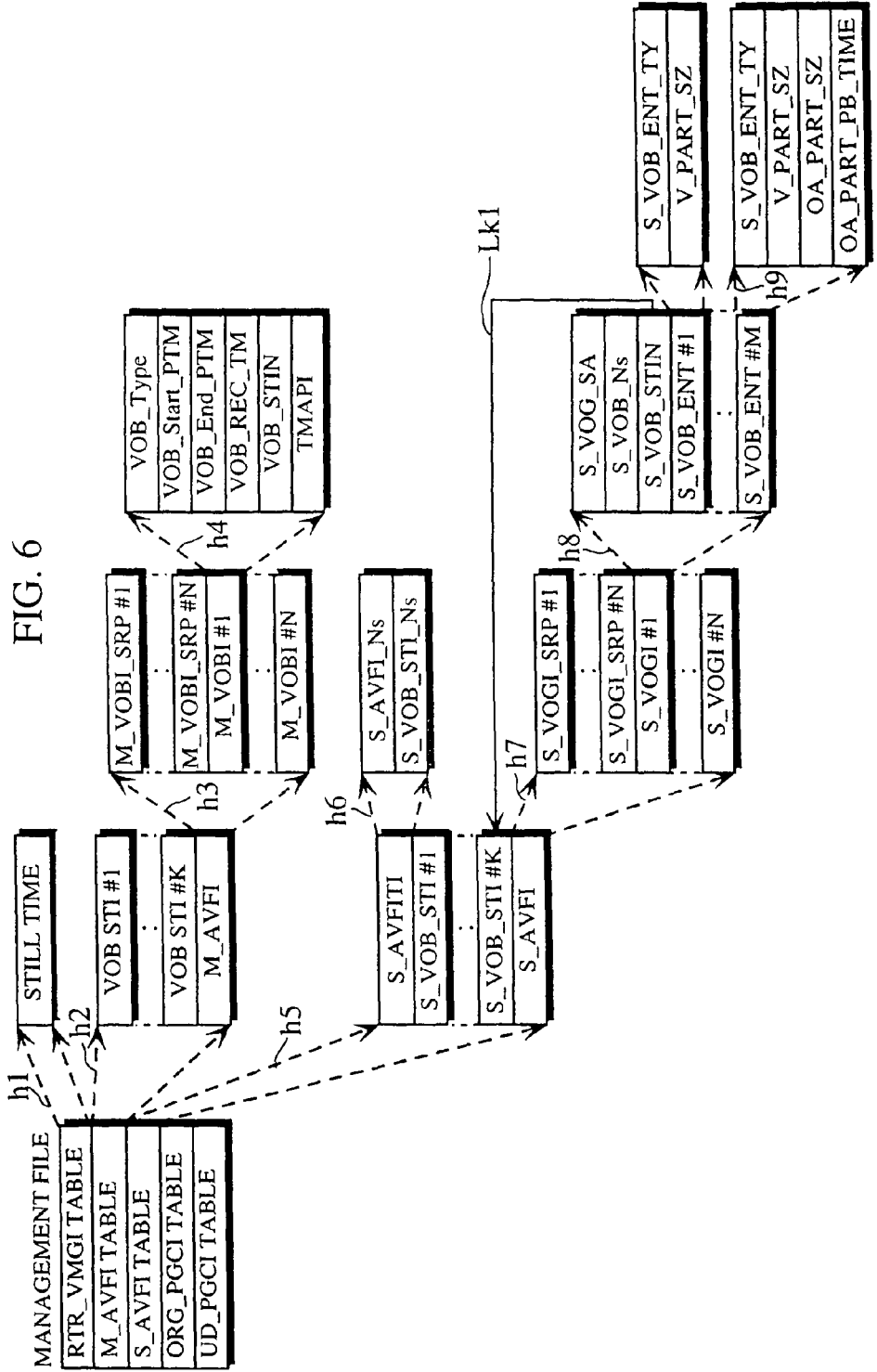
FIG. 6 shows an internal structure of a management file, elaborating on some tables included therein.
Figure 7:
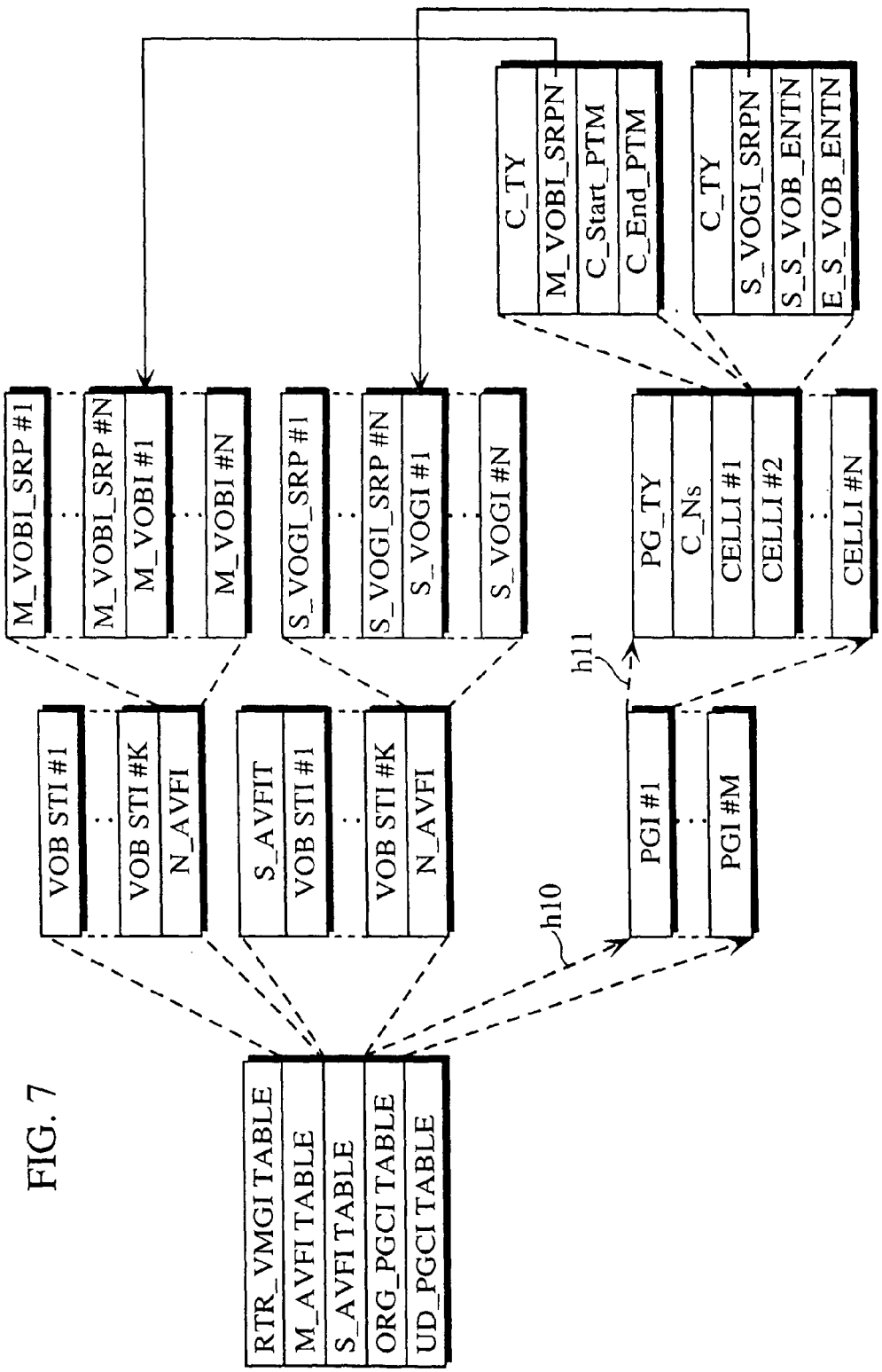
FIG. 7 shows an internal structure of the management file, elaborating on some tables included therein.

The following is a detailed explanation of the management file. FIGS. 6 and 7 each show an internal structure of the management file. As shown in these figures, the management file includes the following five tables:

"RTR_VMGI (Real Time Recording_Video Management Information)" table;
"M_AVFI (AV File Information)" table;
"S_AVFI" table;
"ORG_PGCI (Program Chain Information)" table; and
"UD_PGCI" table An explanation is first given on the RTR_VMGI table, the M_AVFI table, and the S_AVFI table. FIG. 6 shows a detailed description of internal structures of theses tables.

The RTR_VMGI table includes overall information about the management file such as a start address of each table included in the management file. In the RTR_VMGI table, a particular item to be used in the present embodiment is a default value "STILL TIME" showing a reproduction time for reproducing a still image, as indicated by an arrow h1 drawn with a broken line.

The M_AVFI table is composed of sets of information "VOB STI (Stream Information) #1" to "VOB STI#K" that each are VOB attribute information, and information "M_AVFI", as shown by an arrow h2 drawn with a broken line. Each "VOB STI" shows video attribute information of picture data included in each motion VOB, and audio attribute information of audio data included in each motion VOB. The audio attribute information includes a compression method, an aspect ratio, a display method that indicates one of NTSC (National Television Standards Committee), PAL (Phase-Alternation Line), and line 21 information. The video attribute information includes a compression method, a channel number, and a frequency.

The "M_AVFI" is composed of sets of information "M_VOBI_SRP #1" to "M_VOBI_SRP #N" and sets of information "M_VOBI#1" to "M_VOBI#N" as indicated by an arrow h3 drawn with a broken line. Each "M_VOBI" is composed of a VOB type "VOB_Type" that shows a type of a VOB, a presentation start time "VOB_Start_PTM (Presentation_Time)" that shows the time to start reproduction of a video stream that forms the VOB, a presentation end time "VOB_End_PTM" that shows the time to end the reproduction of the video stream that forms the VOB, a record date and time "VOB_REC_TM (Time)" that shows a date and time to start recording the first VOBU included in the VOB, a reference pointer "VOB_STIN (Stream Information Number)" that shows a reference pointer to a "VOB STI" that shows attribute information of the VOB, and time map information "TMAPI (Time Map Information)" of each VOBU that constitutes the VOB, as indicated by an arrow h4 drawn with a broken line.

The S_AVFI table includes information "S_AVFITI (AVFI Table Information)", sets of information "S_VOB_STI#1" to "S_VOB_STI#K", and information "S_AVFI" as indicated by an arrow h5 drawn with a broken line.

The "S_AVFITI" includes information "S_AVFI_Ns (Numbers)" that shows the number of "S_AVFIs" included in the S_AVFI table, and information "S_VOB_STI_Ns" that shows the number of "S_VOB_STIs" included in the S_AVFI table, as indicated by an arrow h6 drawn with a broken line.

The sets of information "S_VOB_STI#1" to "S_VOB_STI#K" each are stream attribute information corresponding to each "Still_VOB" included in the AV file 2. The stream attribute information includes the video attribute information of picture data included in each still VOG, and audio attribute information of audio data included in each still VOG. The video attribute information includes a compression method, an aspect ratio, a display method that indicates one of NTSC, PAL, and line 21 information. The audio attribute information includes a compression method, a channel number, and a frequency.

The "S_AVFI" includes sets of information "S_VOGI_SRP (Search Pointer)#1" to "S_VOGI_SRP#N", and sets of information "S_VOGI#1" to "S_VOGI#N", as indicated by an arrow h7 drawn with a broken line.

Each "S_VOGI" is composed of information "S_VOG_SA (Start Address)" that shows an address of a still VOG corresponding to the "S_VOGI" in the AV file 2, information "S_VOB_Ns" that shows the number of "Still_VOBs" that form the still VOG, information "S_VOB_STIN(Stream Information Number)" that identifies "S_VOB STIs" referred to by the "S_VOGI", out of a plurality of "S_VOB_STIs", and sets of individual information "S_VOB_ENT#1" to "S_VOB_ENT#M" for "Still_VOBs" included in the still VOG, as indicated in by an arrow h8 drawn with a broken line. In the figure, an arrow Lk1 drawn with a solid line represents a link relation of the "S_VOB_STI#K" designated by the "S_VOB_STIN" included in the "SVOGI#1".

Each "S_VOB_ENT" includes information "S_VOB_ENT_TY (Type)" showing that the corresponding "Still_VOB" is either of a still image without an audio, a still image with an original audio, or a still image with an after-recording audio, and information "V_PART_SZ (SiZe)" that shows a size of picture data included in the "Still_VOB". The "S_VOB_ENT" further includes information "OA_PART_SZ" and information "OA_PART_PB (Play-Back)_TIME" when the corresponding "Still_VOB" is with original audio data. The OA_PART SZ shows a size of the original audio data, and the OA_PART_PB_TIME shows a reproduction time of the original audio data.

In FIG. 6, as one example, the "S_VOB_ENT#1" indicates that the corresponding "Still_VOB" is of a still image without an audio, and the "S_VOB_ENT#M" indicates that the corresponding "Still_VOB" is of a still image with an original audio. As the "Still_VOB#1" is without original audio data, the "S_VOB_ENT#1" corresponding to the "Still_VOB#1" does not include the information "OA_PART_SZ" and the information "OA_PART_PB_TIME". On the other hand, as the "Still_VOB#M" is with original audio data, the "S_VOB_ENT#M" corresponding to the "Still_VOB#M" includes the information "OA_PART_SZ" and the information "OA_PART_PB_TIME".

Next, an explanation is given on the ORG_PGCI table. FIG. 7 shows a detailed description of the internal structure of the ORG_PGCI table.

As indicated by an arrow h10 drawn with a broken line, the ORG_PGCI table includes sets of original type PG information "PGI#1" to "PGI#M".

Each "PGI" defines a PG that is a reproduction route in the DVD-RAM, and includes write protection information "PG_TY" that shows whether the corresponding PG is writeprotected, information "C_Ns" that shows the number of cells included in the PG, and sets of cell information "CELLI#1", "CELLI#2, to "CELLI#N" respectively identifying the cells (reproduction sections) included in the PG (reproduction route), as indicated by an arrow h11 drawn with a broken line. There are two types of cells, namely, a motion image cell, and a still image cell.

In FIG. 7, as one example, the "CELLI#1" corresponds to a motion image cell, whereas the "CELLI#2" corresponds to a still image cell.

The motion image cell includes information "C_TY", information "M_VOBI_SRPN(Search Pointer)", and a pair of "C_Start_PTM" and "C_End_PTM". The "C_TY" indicates that the corresponding cell is a motion image cell. The "M_VOBI_SRPN" shows a pointer that designates a "M_VOBI" corresponding to the motion image cell, out of a plurality of "M_VOBIs" included in the "M_AVFI". The "C_Start_PTM" and the "C_End_PTM" are a pair of time codes for designating the start and the end of the motion image cell in the corresponding VOB.

The still image cell includes information "C_TY", information "S_VOGI_SRPN", and a pair of "S_S_VOB_ENTN" and "E_S_VOB_ENTN". The "C_TY" indicates that the corresponding cell is a still image cell. The "S_VOGI_SRPN" shows a pointer that designates a "S_VOGI" corresponding to the still image cell, out of a plurality of "S_VOGIs" included in the "S_AVFI". The "S_S_VOB_ENTN" and the "E_S_VOB_ENTN" are a pair of still number for designating the first "Still_VOB" and the last "Still_VOB" included in the still image cell, out of "Still_VOBs" included in the "Still_VOG".

With the designation of the "S_VOGI" in the "S_VOGI_SRPN", the "Still_VOG" corresponding to the present still image cell can be designated. Also, the "S_S_VOB_ENTN" designates the first "Still_VOB" in the "Still_VOG", and the "E_S_VOB_ENTN" designates the last "Still_VOB" in the "Still_VOG".

The UD_PGCI table includes at least one set of user-defined PGC information.

Figure 8:
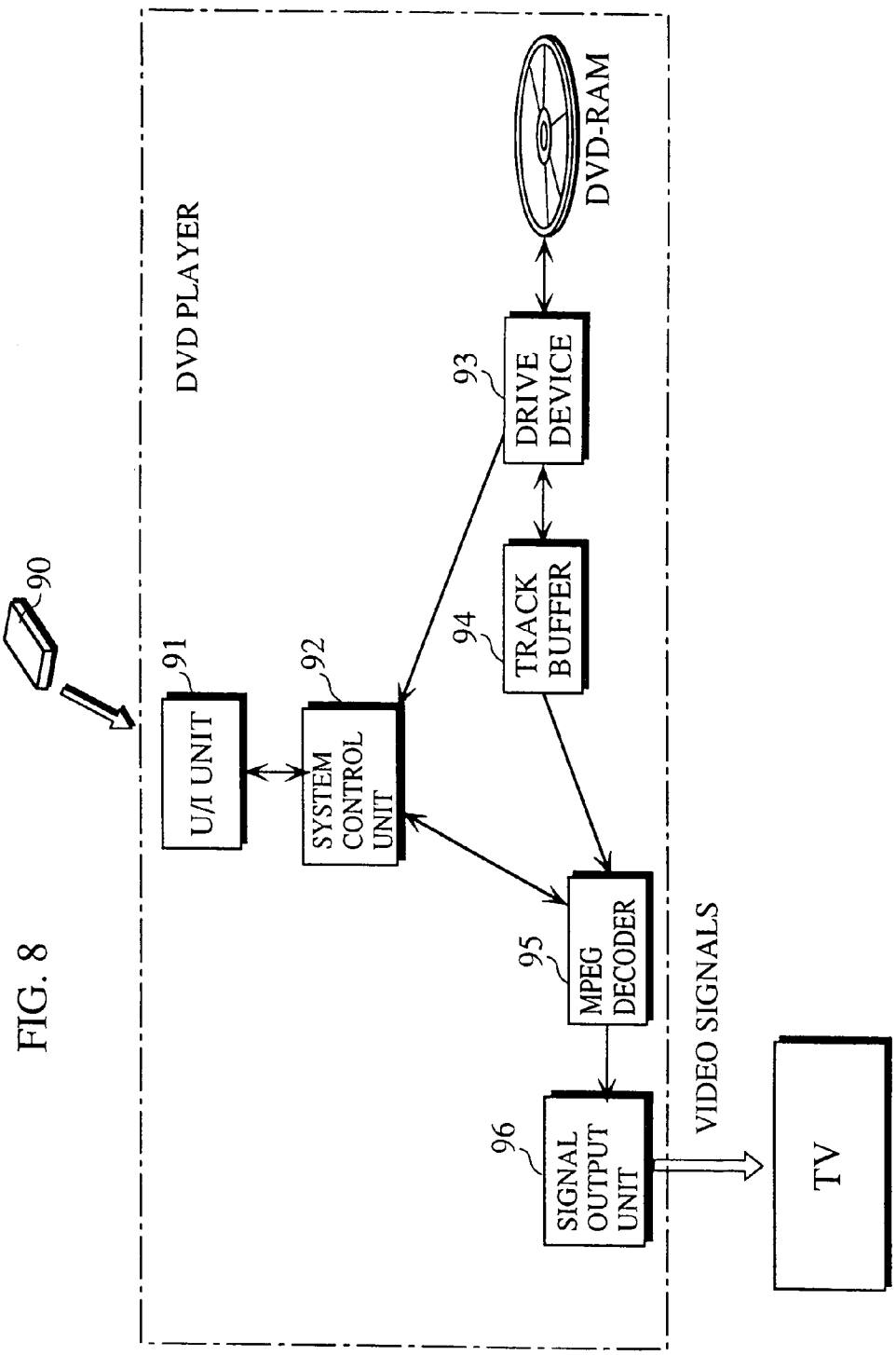
FIG. 8 shows an internal structure of a DVD player relating to a preferred embodiment of the present invention.

The data structure of the DVD-RAM has been explained as above. Next, an explanation is given on the internal structure of the DVD player. FIG. 8 shows the internal structure of the DVD player. In the figure, the DVD player includes a U/I (user interface) unit 91, a system control unit 92, a drive device 93, a truck buffer 94, an MPEG decoder 95, and a signal output unit 96.

The U/I unit 91 provides the user with an interactive operation using a remote controller 90 and a TV. The U/I unit 91 obtains PGs from the DVD-RAM via the system control unit 92, and plots a PG table using OSD (On Screen Graphic) for user selection. The U/I unit 91 then receives a user selection of a PG in the PG table, and notifies the system control unit 92 of identification information that identifies the selected PG.

Also, the U/I unit 91 receives a user designation of one of normal reproduction and special reproduction for reproducing motion image sections and still image sections included in the PG. The remote controller 90 has a "forward-scan" key, a "backward-scan" key, and a jog-dial for receiving a user designation of special reproduction, and a "play" key for receiving a user designation of normal reproduction. The designation of special reproduction by the user operating the forward-scan key, the backward-scan key, or the jog-dial remains valid until the U/I unit 91 newly receives another designation of normal reproduction by the user pressing the play key. If special reproduction is designated while a motion image section is in a state of normal reproduction, the designation of special reproduction is maintained by the U/I unit 91 until normal reproduction is newly designated. In a case where a motion image section is followed by a still image section, the designation of special reproduction made in the motion image section remains valid in the succeeding still image section as well. To nullify the designation of special reproduction, the user has to press the play key to newly designate normal reproduction.

On the contrary, if special reproduction is designated while a still image section is in a state of normal reproduction, the designation of special reproduction remains valid in a motion image section succeeding the still image section.

The system control unit 92 retrieves PGI (PG information) corresponding to the PG selected by the user, obtains sets of cell information that make up the PGI, and retrieves "M_VOBI" and "S_VOGI" referred to by each set of cell information. By referring to the retrieved "M_VOBI" and "S_VOGI", the system control unit 92 notifies the drive device 93 of the start address and the size of a set of picture data to be read, out of a plurality of sets of picture data included in each corresponding "Motion_VOB" and each corresponding "Still_VOG". At the same time, the system control unit 92 instructs the MPEG decoder 95 to decode the read set of picture data.

To be more specific, the following describes various cases.

(i) When the selected PG starts from a motion image cell, the system control unit 92 retrieves a location indicated by the time code "C_Start_PTM" of the present motion image cell from the "TMAPI". The system control unit 92 then retrieves VOBUs included in the present motion image cell identified by the "C_Start_PTM" and the "C_END_PTM", and obtains the start address and the size of the first set of picture data included in each retrieved VOBU. The system control unit 92 then notifies the MPEG decoder 95 of the obtained start address and the size of the first set of picture data included in the retrieved VOBU, and instructs the MPEG decoder to decode the set of picture data. After sending the decode instruction to the MPEG decoder, the system control unit 92 waits for a decode completion notice to be sent from the MPEG decoder 95. Upon receipt of the decode completion notice, the system control unit 92 performs a decode instruction of a next set of picture data included in the VOBU. The system control unit 92 repeats this process on each set of picture data included in each retrieved VOBU.

(ii) When the selected PG includes a still image cell that refers to a "Still_VOG", the system control unit 92 retrieves "S_VOGI" from "S_VOGI_SRPN" in "CELLI" corresponding to the "Still_VOG", and reproduces the S_S_VOB_ENT-$N^{th}$ "Still_VOB" in the "Still_VOG" defined by the "S_VOGI". Suppose the "S_VOG#k" is composed of 50 "Still_VOBs". In this case, the start address of the $20^{th}$ "Still_VOB" in the "S_VOG#k" can be obtained in the following way.

The $1^{st}$ to $19^{th}$ "S_VOB_ENT#.V_PART SZ" and "S_VOB_ENT#.OA_PART_SZ" are summed up, and "S_VOG#.S_VOG_SA" is added to the resulting value to obtain the start address of the $20^{th}$ "Still_VOB". The size of the $20^{th}$ "Still_VOB" can be obtained by referring to the "S_VOB_ENT#.V_PART_SZ". The system control unit 92 notifies the MPEG decoder 95 of the obtained start address and size of the $20^{th}$ "Still_VOB" and, instruct the MPEG decoder to decode the set of picture data of the $20^{th}$ "Still_VOB". After sending the decode instruction to the MPEG decoder 95, the system control unit 92 waits for a decode completion notice to be sent from the MPEG decoder 95.

(ii.1) When the "Still_VOB" is with either original audio data or after-recoding audio data, the decode completion notice is given when reproduction of the audio data is completed.

(ii.2) When the "Still_VOB" is without audio data, the decode completion notice is given when decoding the "Still_VOB" is completed.

When the decode completion notice is sent from the MPEG decoder 95, the system control unit 92 does not immediately instruct to display a next set of picture data. This is because the time from (a) when the system control unit 92 instructs the MPEG decoder 95 to decode the present set of picture data (b) to the MPEG decoder 95 gives the decode completion notice is as short as one second. If the system control unit 92 immediately instructs to display the next set of picture data, the display is to start in a blink. To avoid this, the system control unit 92 freezes for a predetermined wait time. After the predetermine wait time, the system control unit 92 instructs the MPEG decoder 95 to decode the next set of picture data. Note that "STILL_TIME" in the RTR_VMGI table is used as the predetermined wait time in the present embodiment.

In either case of (ii.1) or (ii.2), the system control unit 92 instructs the MPEG decoder 95 to display the next set of picture data when a predetermined time (a reproduction time of audio data, or a wait time defined by "STILL_TIME") passes after the MPEG decoder 95 gives the decode completion notice.

The drive device 93 reads data of the designated size from the start address designated by the system control unit 92 by accessing the DVD-RAM, and stores the read data into the track buffer 94.

The MPEG decoder 95 reads and decodes the picture data stored in the track buffer 94 to obtain video signals, and outputs the video signals to the signal output unit 96.

The signal output unit 96 outputs the video signals the MPEG decoder 95 has obtained by decoding the picture data, to the TV or the like that is connected to the DVD player.

The following is an explanation of the processing performed by the DVD player constructed as above, when special reproduction is instructed. More specifically, the following explains the processing performed by the system control unit 92 when 2×speed reproduction that is one type of special reproduction is designated by the user.

The remote controller 90 is capable of receiving a user designation of the reproduction speed through two types of operations which are explained as follows. In one case where the reproduction speed is designated by the user pressing one of the forward-scan key and the backward-scan key, the remote controller 90 counts the number of times the key is pressed, and sets the reproduction speed higher in accordance with the counted number of times. In the other case where the reproduction speed is designated by the user operating the jog dial, the remote controller 90 detects a dialing angle of the jog dial, and outputs an electric signal showing the degree of the dialing angle, to notify the DVD player of the reproduction speed.

When the reproduction speed is designated through either operation as described above, the system control unit 92 performs a different processing for a motion image section and for a still image section.

For the motion image section, rapid reproduction can be realized by skipping some sets of picture data included therein. The following is an explanation of the processing of rapid reproduction performed by the reproduction apparatus, with reference to FIGS. 9A, 9B, 9C, and 9D.

Figure 9:
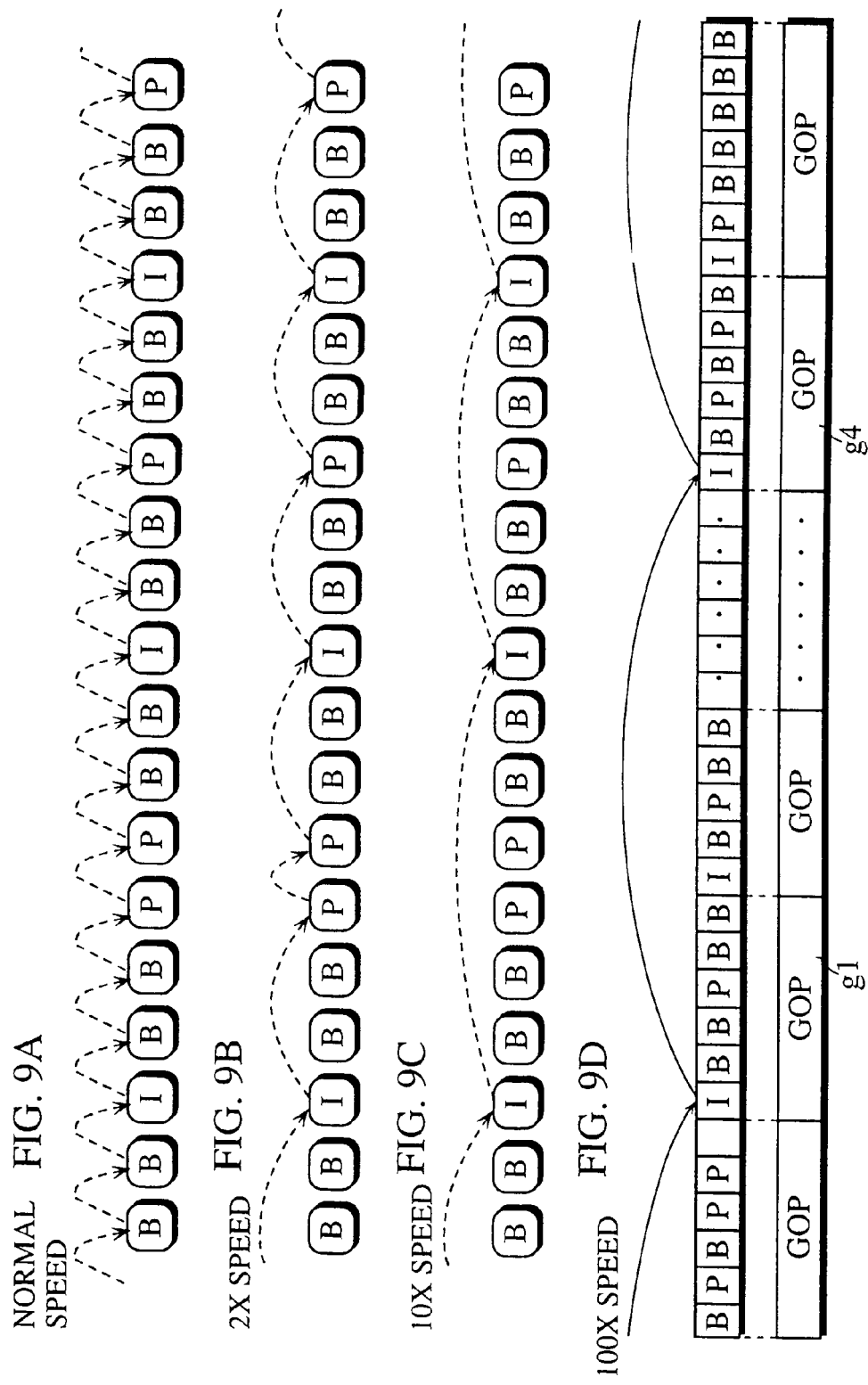
FIG. 9A shows "normal reproduction" for sequentially reproducing sets of picture data included in GOPs.
FIG. 9B shows "IP-reproduction" for skipping B-pictures and sequentially reproducing I-pictures and P-pictures included in GOPs.
FIG. 9C shows "I-reproduction" for skipping B-pictures and P-pictures and sequentially reproducing I-pictures included in GOPs.
FIG. 9D shows "skip-reproduction" for skipping a plurality of GOPs.

FIG. 9A shows "normal reproduction" for sequentially reproducing sets of picture data included in GOPs. FIG. 9B shows "IP-reproduction" for skipping B-pictures and sequentially reproducing I-pictures and P-pictures included in GOPs. FIG. 9C shows "I-reproduction" for skipping B-pictures and P-pictures and sequentially reproducing I-pictures included in GOPs.

FIG. 9D shows "skip-reproduction" for skipping a plurality of GOPs. In the figure, an I-picture in "GOPg1" is reproduced, out of I-pictures included in a plurality of GOPs, and then the succeeding pictures are skipped as indicated by the arrow. An I-picture included in GOPg4 is reproduced next.

With the "IP-reproduction" shown in FIG. 9B, the reproduction apparatus realizes reproduction at approximately two times the normal reproduction speed.

With the "I-reproduction" shown in FIG. 9C, the reproduction apparatus realizes reproduction at approximately 10 times the normal reproduction speed.

Furthermore, with the "skip-reproduction" shown in FIG. 9D, the reproduction apparatus realizes reproduction at 30 times the normal reproduction speed or faster.

As described above, the system control unit 92 can increase or decrease the reproduction speed in each motion image section, by adjusting the number of sets of picture data to be skipped, in accordance with the reproduction speed designated by the user via the remote controller 90.

The following is an explanation of the processing of rapid reproduction in a still image section. The display time of each set of picture data of each still image is determined by the wait time as described above. Each set of picture data is being displayed for the wait time during normal reproduction. Accordingly, by varying the wait time depending on the reproduction speed designated by the user, the reproduction according to the user designation can be realized in the still image section as well.

Figure 10:
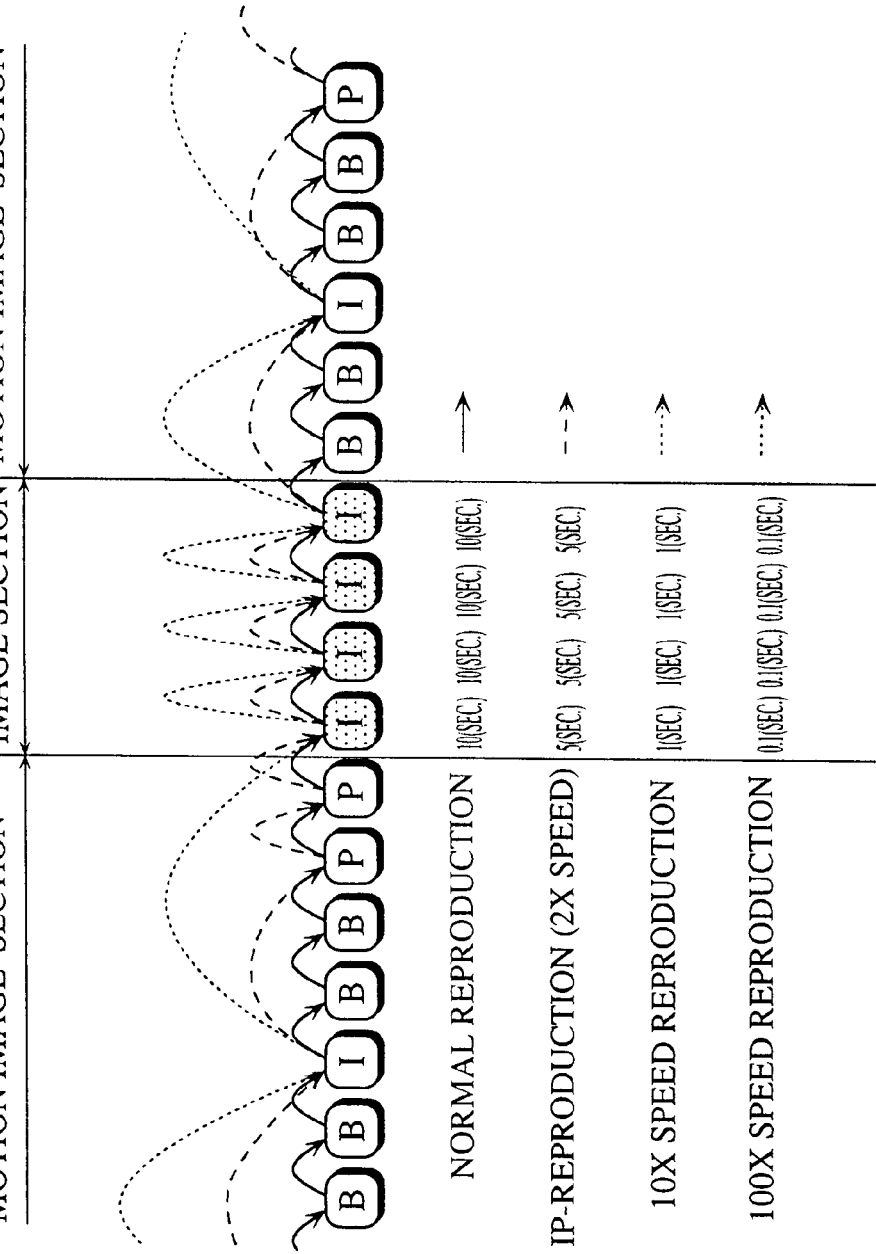
FIG. 10 shows an example of time adjustment for special reproduction of a still image section.

FIG. 10 shows an example of the time adjustment for special reproduction of the still image section. In the figure, the "STILL TIME" is set at 10 seconds. Accordingly, each set of picture data is being reproduced for 10 seconds at normal reproduction. At the 2× speed reproduction (IP-reproduction), each set of picture data is being reproduced for 5 seconds (=10 sec./2). At the 10× speed reproduction, each set of picture data is being reproduced for 1 second (=10 sec./10). At the 10× speed reproduction, each set of picture data is being reproduced for 0.1 second (=10 sec./100). The "STILL TIME" may alternatively be set at 1.0 second depending on the system specifications, or the hardware resource specifications. It should be noted that each set of picture data is reproduced without an audio, even when the set of picture data has audio data, in order to be consistent with the special reproduction operation of a motion image section. This is to avoid such an inconsistent situation where a motion image section is reproduced without an audio, and a still image section immediately succeeding the motion image section is reproduced with an audio.

Figure 11:
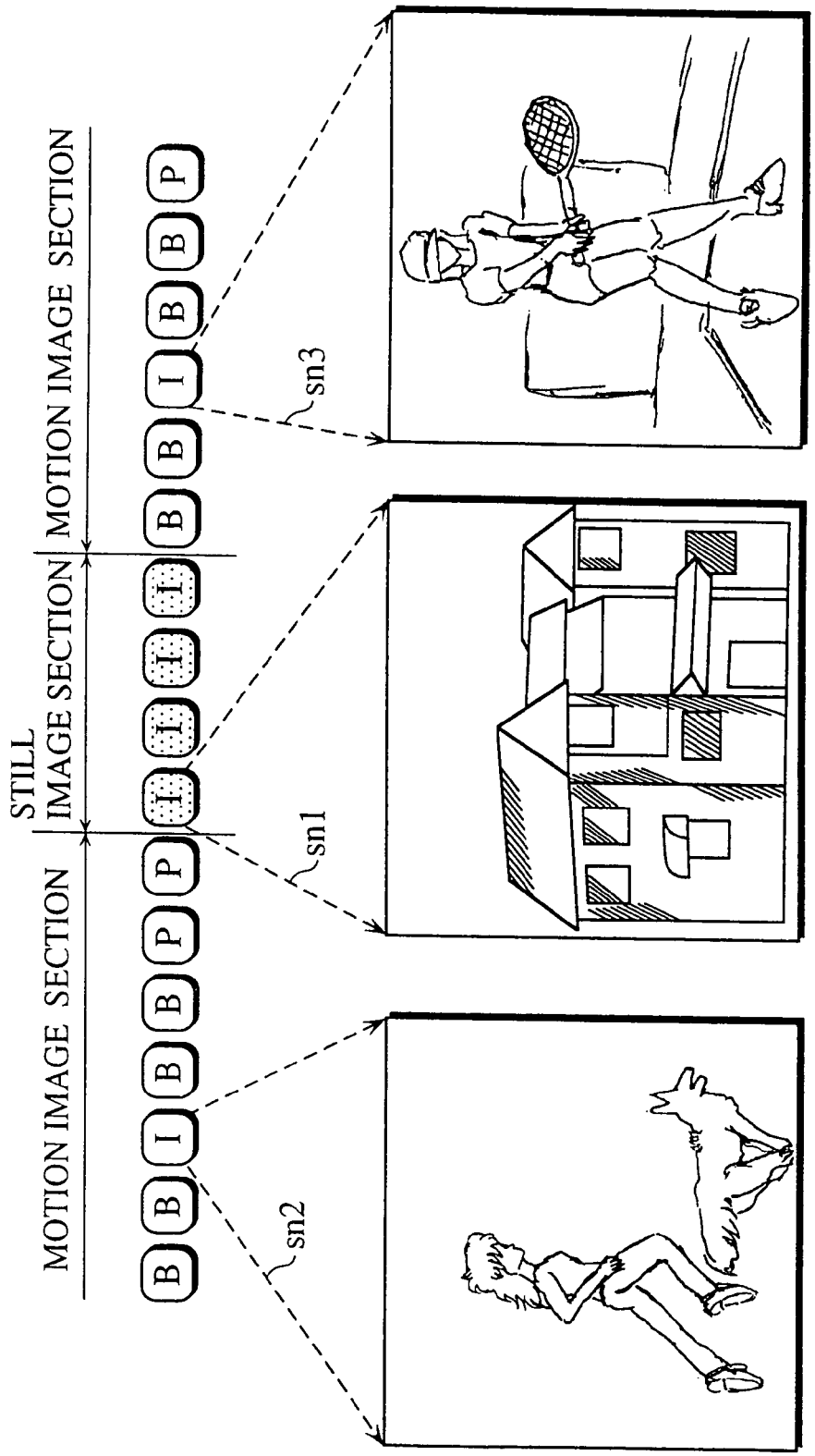
FIG. 11 shows an example of a PG relating to the preferred embodiment of the present invention.

FIG. 11 shows an example of a PG relating to the present embodiment. The PG is recorded at a certain resort, and includes a motion image section, a still image section, and a motion image section in the stated order. In the figure, the still image section includes a still image of a motionless landscape showing buildings at the resort, as shown by a broken line sn1. This still image includes after-recording audio data recorded onto the DVD afterward. This audio is reproduced with the still image. The motion image section preceding the still image section includes a motion image of a lady playing at the resort, as shown by a broken line sn2. The motion image section succeeding the still image section also includes a motion image of a lady playing at the resort, as shown by a broken line sn3. In this PG, a section recording the motionless landscape showing buildings is recorded as the still image section. This reduces the total data size of the PG compared to a case where all sections are recorded as motion image sections. When the user instructs rapid reproduction of this PG, the motion image sections as well as the still image section are reproduced in the way as described in FIG. 10, so that the reproduction time is uniformly shortened.

Figure 12:
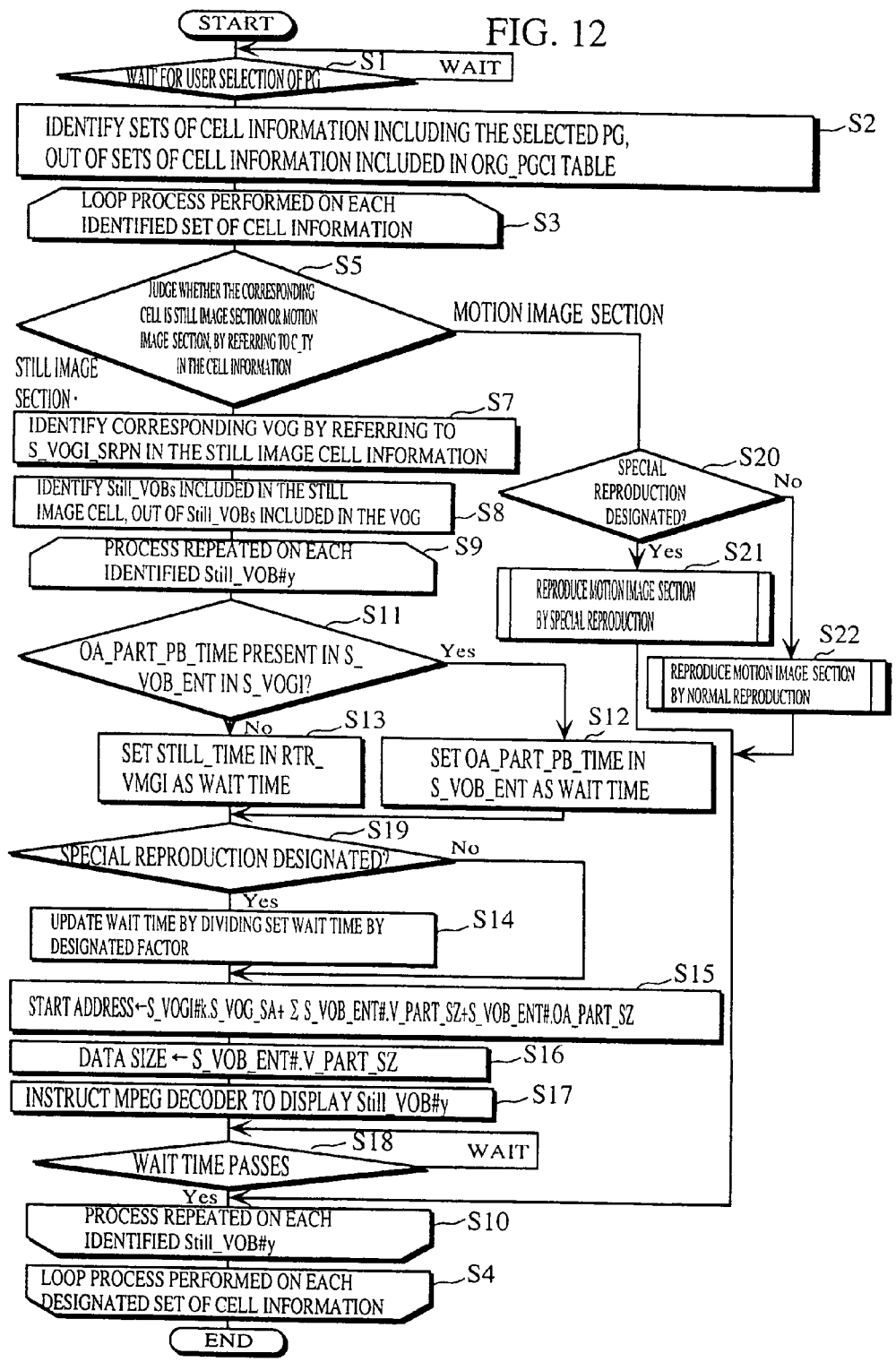
FIG. 12 is a flowchart showing reproduction processing performed when the reproduction speed is designated by the user.

FIG. 12 is a flowchart showing the procedures of the reproduction process when the reproduction speed is designated by the user. The following explains the procedures of the system control unit 92 performed when the reproduction speed is designated by the user, with reference to the flowchart shown in FIG. 12.

In step S1, the control unit 92 displays a PG table, and waits for a selection of a PG by the user. In step S2, the control unit 92 identifies sets of cell information that relate to the selected PG, out of a plurality of sets of cell information included in the ORG_PGCI table. Following this, the loop process having steps S3 and S4 as the loop condition is performed. This loop process is repeated on each of the identified sets of cell information.

In step S5, the system control unit 92 judges whether the present set of cell information shows that the corresponding cell is a still image cell or a motion image cell, by referring to the "C_TY" in the cell information.

When the corresponding cell is a motion image cell, the system control unit 92 judges whether special reproduction is designated during reproduction of the motion image cell in step S20. When special reproduction is judged to be designated in step S20, the processing advances to step S21, where the motion image cell is reproduced by special reproduction as shown in FIGS. 9A to 9D. When normal reproduction is judged to be designated in step S20, the processing advances to step S22, where the motion image cell is reproduced by normal reproduction.

When the corresponding cell is a still image cell, the processing moves from step S5 to step S7, where a still VOG corresponding to the still image cell is identified by referring to the "S_VOGI_SRPN" included in the cell information. In step S8, the system control unit 92 identifies "Still_VOBs" that are included in the still image cell, out of "Still_VOBs" included in the still VOG. Following this, the loop process having steps S9 and S10 as the repeat condition is performed. As shown in steps S9 and S10, the loop process is repeated on each "Still_VOB" included in the still image cell. Here, each "Still_VOB" included in the still image cell is identified by variable "#y".

In step S11, the system control unit 92 judges whether "OA_PART_PB_TIME" is present in "S_VOB_ENT" included in "S_VOGI". When the judgment result in step S11 is affirmative, the control unit 92 sets the "OA_PART_PB_TIME" in the "S_VOB_ENT" included in the "S_VOGI" as the wait time in step S12. When the judgment result in step S11 is negative, the system control unit 92 sets "STILL_TIME" included in "RTR_VMGI" as the wait time in step S13. After the wait time is set in step S12 or step S13, the processing advances to step S19, where the system control unit 92 judges whether special reproduction is designated or not.

When the forward-scan key or the jog dial is operated during reproduction of the still image section, needless to say, it is regarded that special reproduction is designated, and accordingly, the judgment result in step S19 becomes "YES". It should be noted that the judgment result in step S19 also becomes "YES" when the forward-scan key or the jog dial is operated during reproduction of the motion image section and the designation is valid in the succeeding still image section. This also applies to the judgment in step S20. To be more specific, when the forward-scan key or the jog dial is operated during reproduction of a still image section, that is, when special reproduction is designated in the still image section, and the designation is valid in the immediately succeeding motion image section, the judgment result in step S20 becomes "YES". In short, the judgment results in steps S20 and S19 show "special reproduction is designated", not only when special reproduction is designated in the still image section or the motion image section currently under reproduction, but also when special reproduction is designated in a section preceding the still image section or the motion image section.

When the judgment result shows that the special reproduction is designated, the processing advances to step S14, where the system control unit 92 divides the set wait time by a factor designated by the user, and updates the wait time. For reproducing a "Still_VOB" with original audio data, the reproduction time of the original audio data may be set as the wait time at normal reproduction, and "STILL TIME" in the RTR_VMGI table may be set as the wait time at special reproduction. When normal reproduction is designated, the wait time set in step S12 or set in step S13 is used, and so the processing skips step S14 and moves from step S19 to step S15.

In step S15, the system control unit 92 sums up the $1^{st}$ to $(y-1)^{th}$ "S_VOB_ENT#.V_PART_SZ" and the $1^{st}$ to $(y-1)^{th}$ "S_VOB_ENT#.OA_PART_SZ", and then adds "S_VOG#k.S_VOG_SA" to the resulting value, to obtain the start address of the $y^{th}$ "Still_VOB".

In step S16, the system control unit 92 sets the "S_VOB_ENT#.V_PART_SZ" as the data size of the $y^{th}$ "Still_VOB". Following this, the system control unit 92 instructs the MPEG decoder 95 to display the "Still_VOB" in step S17. In step S18, the system control unit 92 freezes for the wait time. After the wait time, the processing advances to step S10.

The processing described above is performed on each "Still_VOB" that constitutes the still VOG, so that rapid reproduction of the still image section is completed.

Figure 13A:
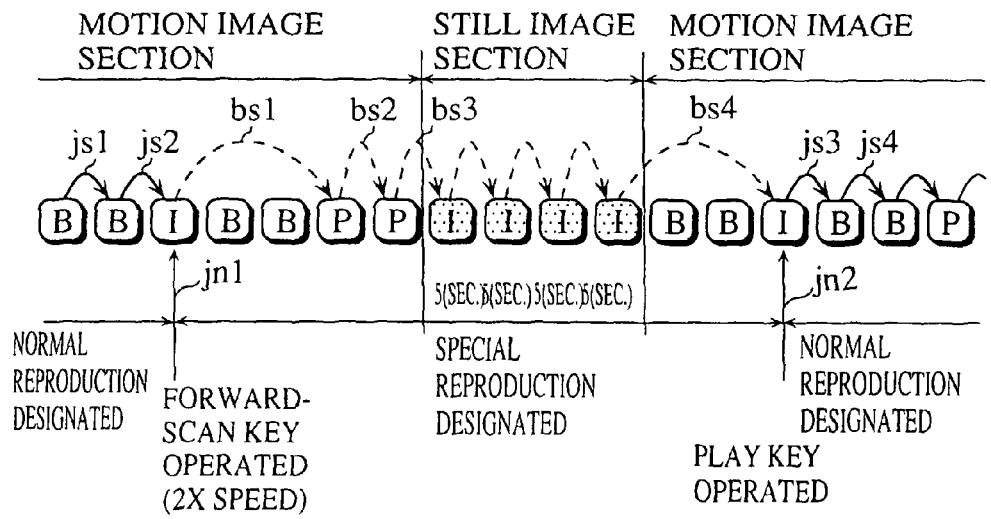
FIG. 13A shows an example operation performed when special reproduction is designated in a motion image section immediately preceding a still image section.

FIG. 13A shows an example operation performed when special reproduction is designated in a motion image section. In the figure, some sets of picture data in the motion image section are sequentially reproduced as indicated by arrows js1 and js2 drawn with solid lines. At the point shown by an arrow jn1, the forward-scan key is operated by the user and special reproduction is designated. Thereafter, the remaining sets of picture data that constitute the motion image section are reproduced with some of them being skipped, as shown by arrows bs1, bs2, and bs3 drawn with broken lines. This designation of special reproduction remains valid in the succeeding still image section, and the sets of picture data in the still image section are reproduced with the wait time being set at 5 seconds, not as being originally set at 10 seconds. After the still image section is completely reproduced, the succeeding motion image section is reproduced with some sets of picture data being skipped as shown by an arrow bs4 drawn with a broken line. At the point indicated by an arrow jn2, the play key is operated by the user and normal reproduction is designated. Thereafter, special reproduction is made invalid, and the designation of normal reproduction becomes valid. As shown by arrows js3 and js4 drawn with solid lines, the remaining sets of picture data in the motion image section are thereafter sequentially reproduced.

Figure 13B:
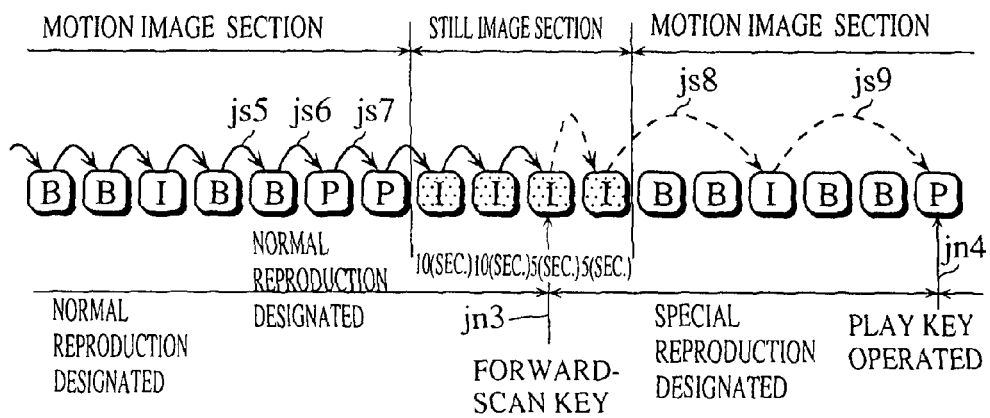
FIG. 13B shows an example operation performed when special reproduction is designated in a still image section.

FIG. 13B shows an example operation performed when special reproduction is designated in a still image section. In the figure, sets of picture data in the motion image section are sequentially reproduced as indicated by arrows js5, jn6, and jn7 drawn with solid lines. Some sets of picture data in the succeeding still image section are reproduced with the wait time being set at 10 seconds. At the point shown by an arrow jn3, the forward-scan key is operated by the user and special reproduction is designated. Thereafter, the remaining sets of picture data in the still image section are reproduced with the wait time being set at 5 seconds. After the still image section is completely reproduced, sets of picture data included in the succeeding motion image section are reproduced with some sets of picture data being skipped as indicated by arrows js8 and js9 drawn with broken lines. At the point indicated by an arrow jn4, the play key is operated by the user and normal reproduction is designated. Thereafter, special reproduction is made invalid, and the designation of normal reproduction becomes valid. Therefore, the remaining sets of picture data in the motion image section are thereafter sequentially reproduced.

Figure 13C:
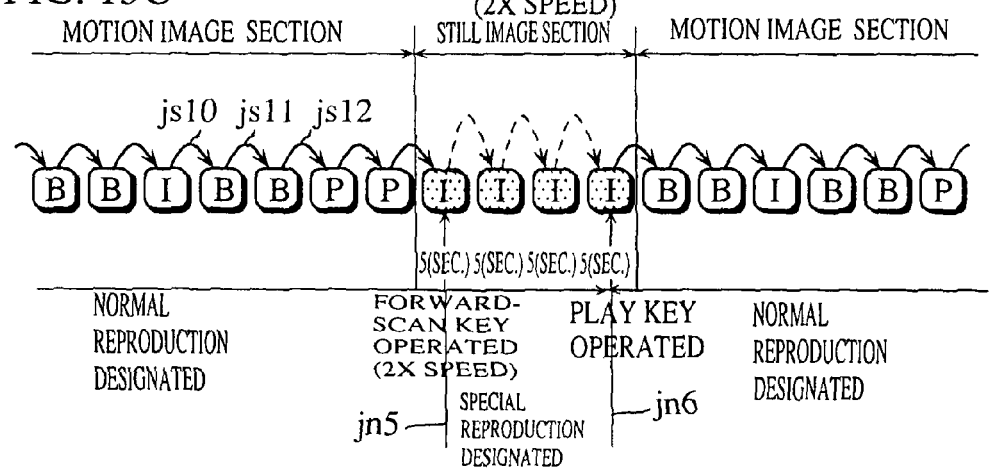
FIG. 13C shows an example operation performed when special reproduction is designated only within a still image section.

FIG. 13C shows an example operation performed when special reproduction is designated only within a still image section. In the figure, sets of picture data in the motion image section are sequentially reproduced as indicated by arrows js10, js11, and js12 drawn with solid lines. At the point shown by an arrow jn5, which is in the succeeding still image section, the forward-scan key is operated by the user and special reproduction is designated, and thereafter, sets of picture data included in the still image section are reproduced with the wait time being set at 5 seconds until the play key is operated by the user at the point shown by an arrow jn6.

Modifications

Although the present invention has been described based on the above embodiment, the invention should not be limited to such. For instance, the following modifications (A), (B), and (C) . . . to (G) are possible.

(A) FIG. 10 explains the case of the motion image section, the still image section, and the motion image section being arranged in the stated order. However, the arrangement can be a still image section, a motion image section, and a still image section in the stated order, or can be a still image section, a still image section, and a still image section in the stated order.

It is needless to say that the wait time of each set of picture data may also be updated in accordance with the user-designated factor of the multiple of the normal reproduction speed, even when the PG is composed of still image sections only.

(B) Although the above embodiment explains the processing of the system control unit 92 at rapid reproduction, this processing may also be performed at slow reproduction. More specifically, when normal reproduction is designated in a still image section, sets of picture data included in the still image section are reproduced for the reproduction time of the original audio data or the after-recording audio data, and when slow reproduction is designated in the still image section, sets of picture data included in the still image section are reproduced for the wait time shown by the "STILL TIME".

(C) In the above embodiment, the DVD player is constructed as being a device that takes the place of a conventional non-portable domestic VCR (vide cassette recorder). However, when the DVD-RAM is also used as the recording medium for a computer, the following system setup may be used. The drive device 93 may function as a DVD-RAM drive device, and may be connected to a computer bus via an interface that complies with SCSI (Small Computer System Interface), IDE (Integrated Development Environment), or IEEE (Institute of Electrical and Electrics Engineers)1394 standard.

In such a case, the other components in FIG. 8 are realized by OS (Operating System) and application programs operating on a hardware of the computer.

(D) In the above embodiment, VOBs are described as being a multiplexed combination of a video stream and an audio stream, although sub-picture data produced by subjecting data for subtitles to run-length encoding may also be multiplexed into VOBs.

(E) The procedures described with reference to the flowchart (in FIG. 12) in the above embodiment may be realized by machine language programs which may be distributed and sold having been recorded on a recording medium. Examples of such recording medium are an IC card, an optical disc, or a floppy disc. The machine language programs recorded on the recording medium may then be installed into a general personal computer. By executing the installed machine language programs, the general personal computer can achieve the functions of the DVD player of the above embodiment.

(F) The above embodiment describes the case where the wait time in the still image section is calculated using the reproduction speed designated by the user as a parameter. Alternatively, other parameters may be used, or the wait time may not be calculated based on these parameter, but may simply be set longer or shorter.

Figure 14:
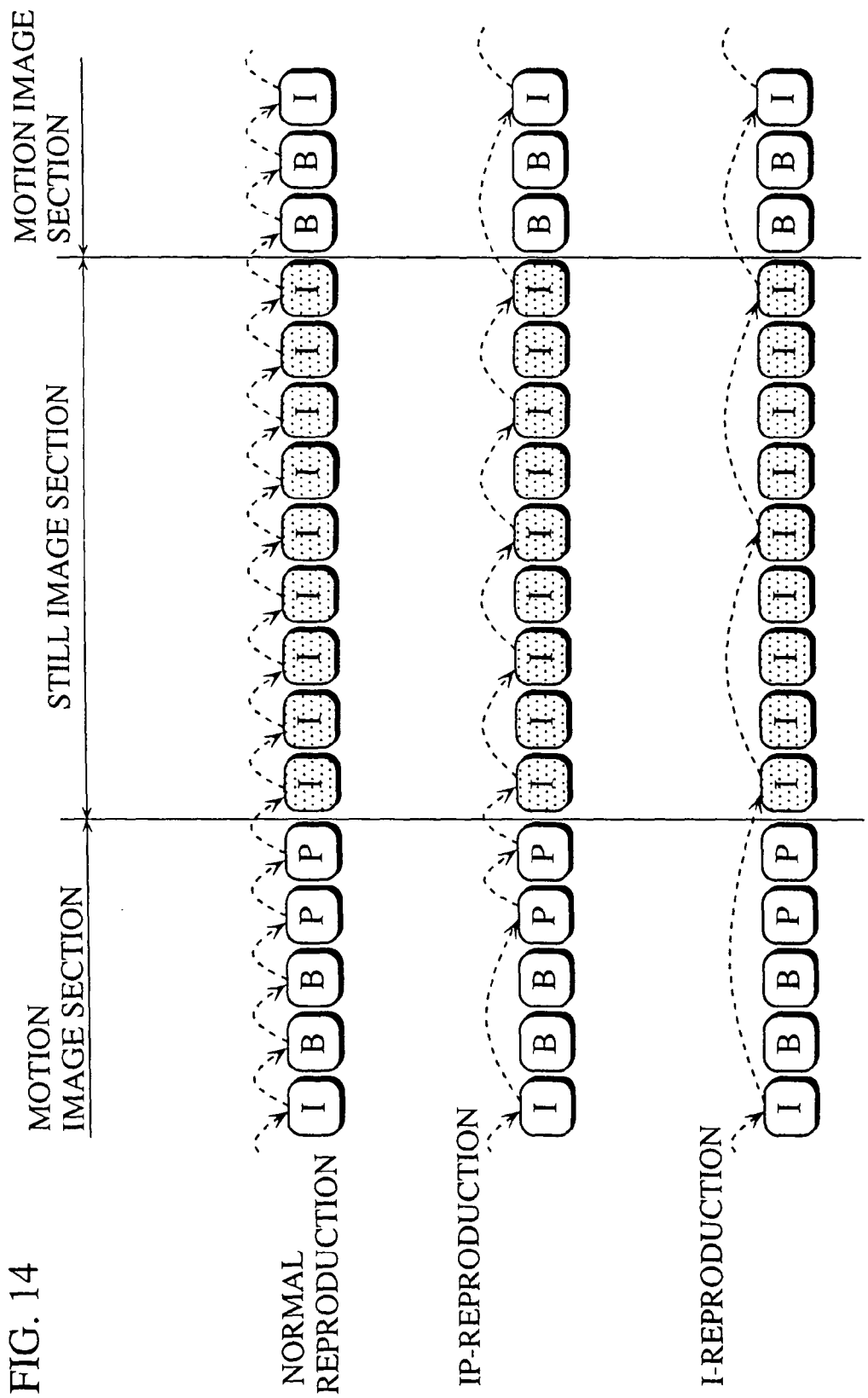
FIG. 14 shows an operation of skipping some sets of picture data in a still image section.

(G) As a method to effectively perform special reproduction of still images other than the method of shortening the reproduction time of each still image as described in the above embodiment, some of the still images may be skipped when reproduced. This enhances the effect in special reproduction. FIG. 14 shows the case where some still images are skipped. In the figure, sets of picture data are sequentially reproduced at "normal reproduction", whereas every other sets of picture data are skipped at "IP-reproduction" and every four pictures are skipped at "I-reproduction".

As described above, the reproduction apparatus relating to the present invention enables such reproduction that complies with the user intention when a motion image section and a still image section form a single reproduction route. This enhances additional values of the reproduction apparatus, which will further contribute to the development of consumer appliance industries.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A reproduction apparatus for reproducing a video object sequence recorded on a recording medium, the video object sequence including motion and still video objects that correspond to motion-image recording and still-image recording, respectively, and that are recorded in response to a user operation for switching between the motion-image recording and the still-image recording, the reproduction apparatus comprising:
   a judging unit operable to judge whether special reproduction or normal reproduction of a motion video object is designated by a user; and
   a reproducing unit operable to reproduce each set of picture data included in a still video object subsequent to the motion video object in the video object sequence,
   wherein the reproducing unit
   (a) continues to display each set of picture data, included in the still video object subsequent to the motion video object in the video object sequence, during a first time, when the normal reproduction of the motion video object is designated, and
   (b) continues to display each set of picture data, included in the still video object subsequent to the motion video object in the video object sequence, during a second time that differs from the first time, when the special reproduction of the motion video object is designated.

2. The reproduction apparatus of claim 1, wherein the special reproduction indicates to reproduce each set of picture data included in the still video object according to a multiple of a normal reproduction speed, a factor of the multiple being designated by the user, and
   the second time is based on a value obtained by dividing the first time by the designated factor.

3. The reproduction apparatus of claim 2,
   wherein the still video object includes audio data to be reproduced together with the set of picture data included therein, and
   the first time is a reproduction time of the audio data.

4. The reproduction apparatus of claim 3, further comprising
   an audio reproducing unit operable to reproduce the audio data included in the still video object only when the normal reproduction is designated.

5. The reproduction apparatus of claim 3,
   wherein the audio data is original audio data and/or after-recording audio data, the original audio data having been recorded with the set of picture data included in the still video object, the after-recording audio data having been recorded by an after-recording operation for the set of picture data included in the still video object.

6. The reproduction apparatus of claim 1,
   wherein time information is further recorded on the recording medium, the time information showing a default reproduction time of the set of picture data included in the still video object,
   the still video object includes audio data to be reproduced together with the set of picture data included therein,
   the first time is a reproduction time of the audio data, and
   the second time is the default reproduction time shown by the time information.

7. A computer-readable recording medium on which a program is recorded, the program realizing a reproduction procedure on a computer, the reproduction procedure relating to reproducing a video object sequence recorded on a recording medium, the video object sequence including motion and still video objects that correspond to motion-image recording and still-image recording, respectively, and that are recorded in response to a user operation for switching between the motion-image recording and the still-image recording, the program comprising:
   a judging step for judging whether special reproduction or normal reproduction of a motion video object is designated by a user; and
   a reproducing step for reproducing each set of picture data included in a still video object subsequent to the motion video object in the video object sequence,
   wherein in the reproducing step
   (a) each set of picture data, included in the still video object subsequent to the motion video object in the video object sequence, continues to be displayed during a first time, when the normal reproduction of the motion video object is designated, and
   (b) each set of picture data, included in the still video object subsequent to the motion video object in the video object sequence, continues to be displayed during a second time that differs from the first time, when the special reproduction of the motion video object is designated.

8. The computer-readable recording medium of claim 7, wherein the special reproduction indicates to reproduce each set of picture data included in the still video object according to a multiple of a normal reproduction speed, a factor of the multiple being designated by the user, and
   the second time is based on a value obtained by dividing the first time by the designated factor.

* * * * *